US010380418B2

(12) United States Patent
Agrawal et al.

(10) Patent No.: US 10,380,418 B2
(45) Date of Patent: Aug. 13, 2019

(54) IRIS RECOGNITION BASED ON THREE-DIMENSIONAL SIGNATURES

(71) Applicant: Microsoft Technology Licensing, LLC, Redmond, WA (US)

(72) Inventors: Mudit Agrawal, Bellevue, WA (US); Akihiro Tsukada, Tokyo (JP)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 94 days.

(21) Appl. No.: 15/626,943

(22) Filed: Jun. 19, 2017

(65) Prior Publication Data

US 2018/0365490 A1    Dec. 20, 2018

(51) Int. Cl.
*G06K 9/00* (2006.01)
*G06K 9/46* (2006.01)

(52) U.S. Cl.
CPC ....... *G06K 9/00604* (2013.01); *G06K 9/0061* (2013.01); *G06K 9/00617* (2013.01); *G06K 9/00899* (2013.01); *G06K 9/4604* (2013.01); *G06T 2207/30041* (2013.01)

(58) Field of Classification Search
CPC ............. G06K 9/00604; G06K 9/0061; G06K 9/00597; G06K 9/00617; G06F 21/32
See application file for complete search history.

(56) References Cited

U.S. PATENT DOCUMENTS

| 10,049,272 | B2 * | 8/2018 | Agrawal | G06K 9/00604 |
| 2007/0110285 | A1 * | 5/2007 | Hanna | G06K 9/00604 |
| | | | | 382/117 |
| 2009/0016574 | A1 * | 1/2009 | Tsukahara | A61B 5/117 |
| | | | | 382/117 |
| 2009/0161925 | A1 * | 6/2009 | Cottard | G06K 9/00604 |
| | | | | 382/128 |
| 2012/0045095 | A1 * | 2/2012 | Tate | G06T 5/003 |
| | | | | 382/103 |
| 2014/0044318 | A1 * | 2/2014 | Derakhshani | G06K 9/00597 |
| | | | | 382/117 |
| 2014/0161325 | A1 | 6/2014 | Bergen | |
| 2015/0016692 | A1 | 1/2015 | Hanna et al. | |

(Continued)

OTHER PUBLICATIONS

Lee, et al., "Fake Iris Detection Based on 3D Structure of Iris Pattern", In International Journal of Imaging Systems and Technology, vol. 20, Issue 2, Jun. 2010, 1 page.

(Continued)

*Primary Examiner* — Li Liu

(74) *Attorney, Agent, or Firm* — Alleman Hall Creasman & Tuttle LLP

(57) ABSTRACT

A first image set that includes a plurality of 2D images of an eye of a user is collected. Two or more sets of corresponding pixels are generated from the plurality of 2D images. One or more 3D features of an iris of the user is extracted based on repeatable differences in reflectance among each set of corresponding pixels. A test set of 3D features for a submitted eye is generated based on a second image set, the second image set including a plurality of 2D images of the submitted eye. Based on a comparison of the one or more extracted 3D features and the test set of 3D features, an indication is made as to whether the second image set is representative of the user's eye.

20 Claims, 8 Drawing Sheets

(56) References Cited

U.S. PATENT DOCUMENTS

| | | | | |
|---|---|---|---|---|
| 2015/0235070 A1* | 8/2015 | Wang | ............... | G06K 9/00006 |
| | | | | 382/115 |
| 2015/0347841 A1* | 12/2015 | Mears | ............... | G06K 9/00604 |
| | | | | 348/46 |
| 2016/0019420 A1* | 1/2016 | Feng | ............... | G06K 9/00604 |
| | | | | 382/117 |
| 2017/0098119 A1* | 4/2017 | Gope | ............... | G06K 9/00281 |
| 2017/0103261 A1* | 4/2017 | Rauhala | ............ | G06K 9/00597 |
| 2017/0103276 A1* | 4/2017 | Rauhala | ............ | G06F 17/30259 |
| 2017/0323167 A1* | 11/2017 | Mapen | ............... | G06K 9/4661 |

OTHER PUBLICATIONS

Lee, et al., "Anti-Spoofing Method for Iris Recognition by Combining the Optical and Textural Features of Human Eye.", In Proceedings of KSII Transactions on Internet and Information Systems vol. 6, No. 9, Jan. 9, 2012, 8 pages.

Galbally, et al., "A Review of Iris Anti-Spoofing", In Proceedings of 4th International Workshop on Biometrics and Forensics, Mar. 3, 2016, 7 pages.

Ahmed, et al., "Iris Anti-spoofing: Static and Dynamic Technique", In Journal of Engineering & Technology, vol. 34, No. 4, Nov. 9, 2015, pp. 598-609.

Bodade, et al., "Fake Iris Detection: A Holistic Approach", In International Journal of Computer Applications, vol. 19, No. 2, Apr. 2011, pp. 1-7.

Daugman, J, "How Iris Recognition Works", In the Proceedings of IEEE Transactions on Circuits and Systems for Video Technology, vol. 14, Issue 1, Jan. 30, 2004, pp. 21-30.

"International Search Report and Written Opinion Issued in PCT Application No. PCT/US2018/034249", dated Sep. 5, 2018, 12 Pages.

* cited by examiner

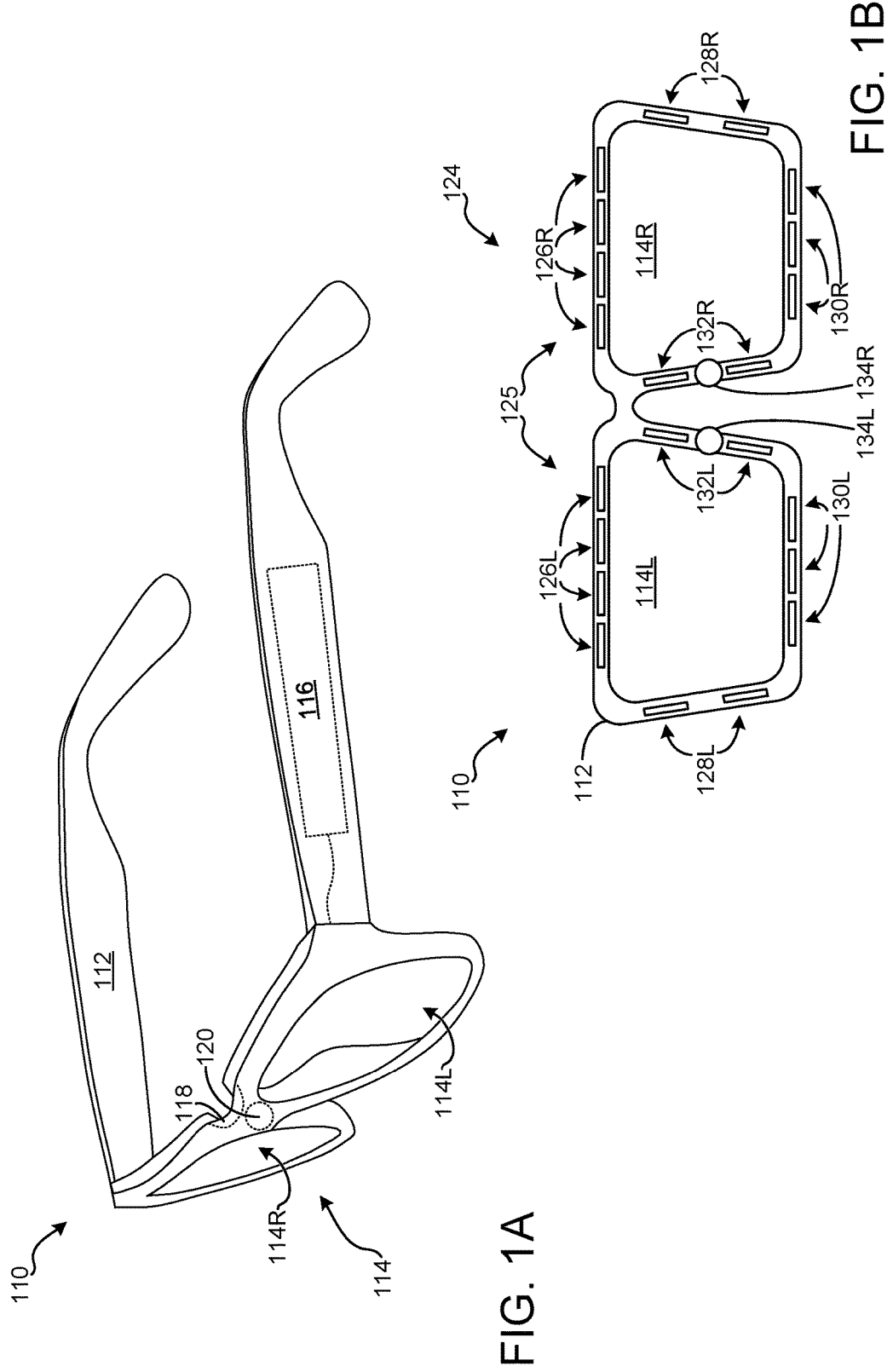

IRIS RECOGNITION BASED ON THREE-DIMENSIONAL SIGNATURES

BACKGROUND

Iris recognition is utilized as a secure form of biometric authentication and user verification. A user's identity may be inferred based on unique characteristics that can be derived from imaging that user's eye.

BRIEF DESCRIPTION OF THE DRAWINGS

FIG. 1A shows a schematic view of a head-mounted display device with eye imaging capabilities according to an example of the present disclosure.

FIG. 1B shows an additional view of the head-mounted display device with eye imaging capabilities of FIG. 1A.

DETAILED DESCRIPTION

Figure 2A:
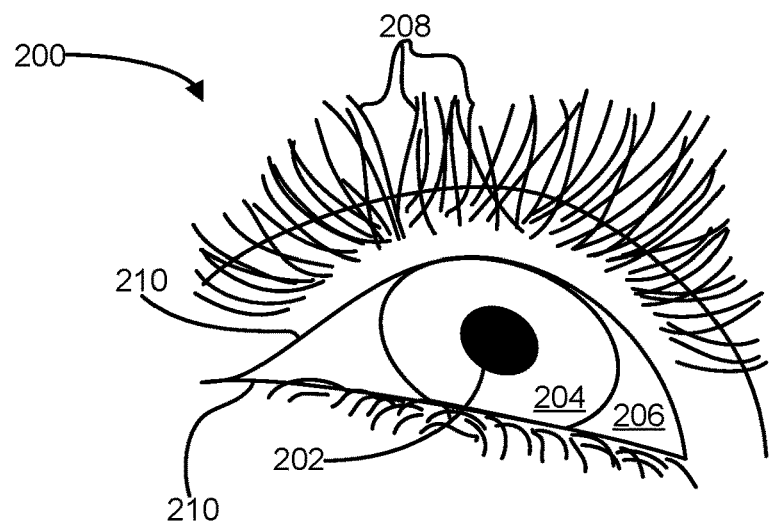
FIGS. 2A and 2B schematically show anatomical features of a human eye.

Iris imaging may be used to generate authentication factors for methods that recognize and/or verify the identity of a user. For example, iris imaging may be used to authenticate a user signing onto a computing device, to grant physical access to a secured location, etc. These authentication factors are considered unique and secure, even when compared to other forms of biometric authentication and verification. Iris recognition may be used for authentication by any device coupled to a high-resolution digital camera. With cameras decreasing in size and becoming incorporated into a significant portion of consumer electronic devices, iris recognition can now be used as the primary mode of authentication for securing data on the same device that performs the iris imaging.

The prevalence of high-resolution cameras also increases the ability of would-be attackers to generate or obtain a high-fidelity image of a user's face, and to use such an image to generate a spoof (e.g., printed replica) of the user's iris. Such spoofs may be presented to imaging cameras as a means for mimicking a user's iris. As such, there is a demand for anti-spoofing technology that increases the security of iris imaging based authentication.

Iris imaging is typically performed via a two-dimensional (2D) camera. A single image may be taken with the user staring directly into the camera. The unique structure and qualities of the user's iris yields an image with unique, repeatable features. During authentication, another eye image is taken, and features of the new image are then compared to stored data from the original eye image.

However, 2D iris imaging is susceptible to spoofing. A high-resolution image of a user's iris may be printed on high-quality paper and presented for authentication. Further, a printed iris image may be placed over an attacker's eye (akin to a contact lens), thus surrounding the fake iris with real facial components and providing enough information to defeat many anti-spoofing measures.

Some anti-spoofing measures include determining 2D texture patterns of the iris, multi-spectral imaging (e.g., RGB+IR), and eye movement patterns (e.g., pupil dilation, eye-tracking). However, these methods either rely on special sensors, which may reduce implementation, or can be defeated by rigs that replicate eye movements. Other anti-spoofing measures have focused on determining the presence or absence of any 3D structure in the imaged iris in order to distinguish real irises from paper printouts. However, this approach may be defeated by attacks wherein random 3D folds are created on a printed iris (e.g., pushing fingernails on the paper to create palpable bumps).

As such, it is desirable for iris recognition to focus on the liveness of the iris itself, rather than relying on the liveness of the entire periocular region. In particular, the iris has a fine 3D structure that may be used as the basis of a user-specific 3D signature. Such structure cannot be captured without the user's explicit support and consent, and is harder to spoof using 2D or 3D printing methods.

In this detailed description, systems and methods are presented wherein iris images are generated from multiple illumination angles over multiple time points in order to extract rich, unique, 3D structural features for a user's iris. These features may be used both to enhance the iris recognition signature (e.g., by increasing the degrees of freedom in a 2D iris recognition pipeline), and to prevent against iris spoofing.

In one example implementation, an eye-imaging and iris-recognition system may be incorporated into a head-mounted display (HMD) device. Iris recognition may be performed each time a user puts the HMD device on. If a user is recognized based on their iris signature, they may be signed on to the device. In some examples, multiple users may share the same HMD device, but data, preferences, personal information, etc. affiliated with one user may be kept separate and private from other users through the use of iris recognition. Further, non-registered users of the HMD device may not be provided access to any personal data, and may denied access privileges to the device as a whole. One or both eyes may be imaged and subject to verification in order to sign a user on to the device.

FIGS. 1A and 1B schematically illustrate an example head-mounted display device 110. The head-mounted display device 110 includes a frame 112 in the form of spectacles wearable on the head of a user that supports see-through display componentry (e.g., for augmented reality applications) or opaque display componentry (e.g., for virtual reality applications) positioned nearby the user's eyes. Head-mounted display device 110 may use augmented reality technologies to enable simultaneous viewing of virtual display imagery and a real-world background. As such, head-mounted display device 110 may generate virtual images via display 114, which includes separate right and left eye displays 114R and 114L, and which may be wholly or partially transparent.

Display 114 may take any suitable form, such as a waveguide or prism configured to receive a generated image and direct the image towards a wearer's eye. Display 114 may include a backlight and a microdisplay, such as liquid-crystal display (LCD) or liquid crystal on silicon (LCOS) display, in combination with one or more light-emitting diodes (LEDs), laser diodes, and/or other light sources. In other examples, display 114 may utilize quantum-dot display technologies, active-matrix organic LED (OLED) technology, and/or any other suitable display technologies. It will be understood that while shown in FIGS. 1A and 1B as a flat display surface with left and right eye displays, display 114 may be a single display, may be curved, or may take any other suitable form. Head-mounted display device 110 may further include an additional see-through optical component, such as a see-through veil positioned between display 114 and the real-world environment as viewed by a wearer.

A controller 116 is operatively coupled to display 114 and to other display componentry. Controller 116 includes one or more logic devices and one or more computer memory devices storing instructions executable by the logic device(s) to enact functionalities of head-mounted display device 110. Head-mounted display device 110 may further include various other components, for example a two-dimensional image camera 118 (e.g. a visible light camera and/or infrared camera) and a depth imaging device 120, as well as other components that are not shown, including but not limited to speakers, microphones, accelerometers, gyroscopes, magnetometers, temperature sensors, touch sensors, proximity sensors, biometric sensors, other image sensors, energy-storage components (e.g. battery), a communication facility, a GPS receiver, etc.

Depth imaging device 120 may include an infrared light-based depth camera (also referred to as an infrared light camera) configured to acquire video of a scene including one or more human subjects. The acquired video may include a time-resolved sequence of images of spatial resolution and frame rate suitable for the purposes set forth herein. Depth imaging device 120 and/or a cooperating computing system (e.g., controller 116) may be configured to process the acquired video to identify one or more objects within the operating environment, one or more postures and/or gestures of the user wearing head-mounted display device 110, one or more postures and/or gestures of other users within the operating environment, etc.

Continuing in FIG. 1B, head-mounted display device 110 further includes an eye-imaging system 124 configured to sense properties of the right and/or left eye of the user of head-mounted display device 110. Although depicted as part of head-mounted display device 110, eye-imaging system 124 or similar eye-imaging systems may be incorporated within desktop computers, PCs, hand-held smart phones, e-readers, laptop, notebook and tablet computers, standalone displays, automotive computers, etc. While described mainly in the context of iris recognition and other security applications, eye-imaging system 124 or similar eye-imaging systems may additionally or alternatively be utilized for eye-tracking or gaze-tracking, and/or in safety applications such as driver alertness detection.

In the example depicted in FIG. 1B, eye-imaging system 124 includes a plurality of optical sources 125 that are mounted to frame 112 and configured to emit visible and/or infrared light rays toward the eye of the user. For example, optical sources 125 include upper optical sources 126L and 126R, which may be configured to emit light rays towards the left eye and right eye of the user, respectively, from a position above each eye. Optical sources 125 further include exterior optical sources 128L and 128R, which may be which may be configured to emit light rays towards the left eye and right eye of the user, respectively, from a temporal position relative to each eye. Optical sources 125 further include lower optical sources 130L and 130R, which may be which may be configured to emit light rays towards the left eye and right eye of the user, respectively, from a position below each eye. Optical sources 125 further include interior optical sources 132L and 132R, which may be which may be configured to emit light rays towards the left eye and right eye of the user, respectively, from a nasal position relative to each eye. Although depicted as being specific to the left and right eye, respectively, in some examples, eye-imaging system 124 may include one or more optical sources configured to emit infrared light rays towards both eyes of the user, be it simultaneously or alternately.

Eye-imaging system 124 further includes optical sensors 134L and 134R which may be arranged and otherwise configured to receive light reflected off the left and right eye of the user, respectively. For example, optical sensors 134L and 134R may be configured to receive light in the emission-wavelength range of optical sources 125. Optical sensors 134L and 134R may each include a plurality of light-receiving photo-sensors. Image data generated by shuttered optical sensors 134L and 134R may be conveyed to controller 116 and/or one or more additional processors for processing and/or analysis.

Although depicted at the interior of frame 112, optical sensors 134L and 134R may be coupled to frame 112 at any position suitable to receive light reflected from the eyes of the user. Optical sensors 134L and 134R may be trained on each eye at a fixed angle and/or fixed plane of focus, or may be configured to physically adjust one or more imaging parameters (e.g., zooming in or out, adjustable positioning). Further, although single optical sensors for each eye are shown, in some examples, there may be multiple optical sensors per eye, aimed to image the eye from different viewpoints. For example, the optical sensors may include a plurality of photodiodes for each eye arranged on frame 112, collectively configured to capture light emitted and/or reflected from various angles.

Optical sensors 134L and 134R may include one or more shuttering devices configured to selectively expose the sensor to light. In some examples, closing of the shutter may block a substantial amount of light from entering its respective sensor, thus generating a high contrast ratio between the open and closed states.

Image data generated by optical sensors 134L and 134R may be processed to resolve such eye features as pupil center, pupil outline, iris outline, iris color, 3D iris characteristics, and/or one or more specular glints from the cornea. Based on this information, eye-imaging system 124 may determine whether the imaged eye(s) are sufficiently similar to eye data stored for one or more users of HMD device 110.

Figure 2B:
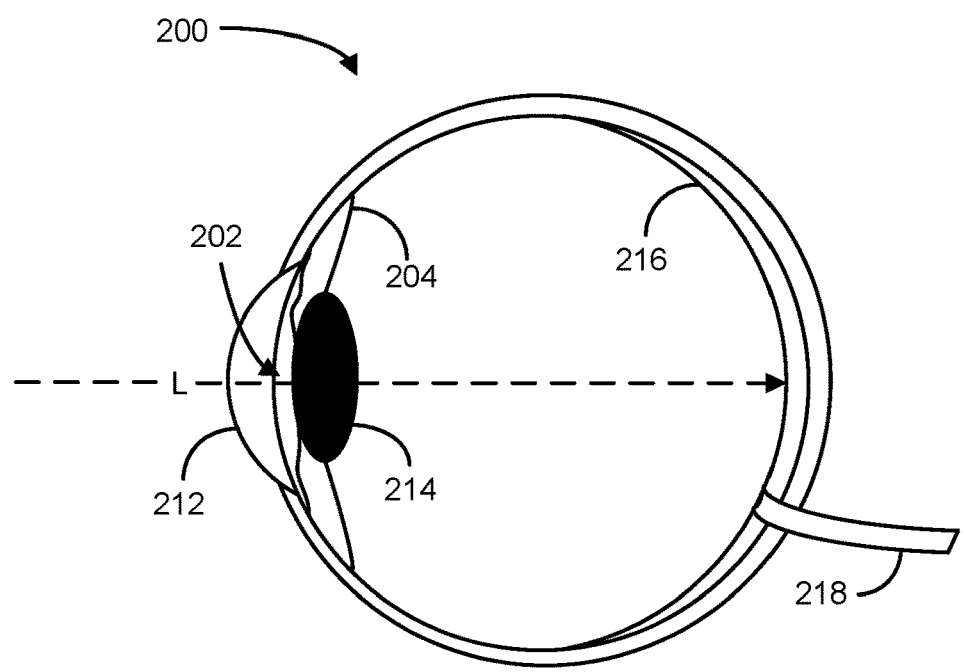

FIGS. 2A and 2B schematically show anatomical features of a human eye. FIG. 2A depicts a direct facing view of eye 200, showing various features of the eye such as pupil 202, iris 204, sclera 206, eyelashes 208, and eyelids 210. FIG. 2B shows a sagittal section of eye 200, which has a pupil 202, an iris 204, a cornea 212, and a lens 214. In FIG. 2A, light L is shown passing through cornea 212, pupil 202, and lens 214 to reach retina 216, which includes a layer of rod and cone photoreceptor cells. Photoreceptors that are excited by light L then convey information regarding the intensity and color of light L to the user's brain via optic nerve 218, where it can be integrated with signals from photoreceptors excited by other light sources.

External light L may also impinge upon and be reflected by the front corneal surface of eye 200. Such reflections may appear as intense areas or glints when the eye is imaged. During imaging, the positioning and intensity of such glints may vary depending on the relative positions of the optical source(s), eye, and optical sensor(s). In some scenarios, one or more eyelashes 208, eyelids 210, and/or other obstructions may occlude or obscure a portion of pupil 202 and/or iris 204, either directly or via shadows. Such images may be discarded, occluded regions and/or regions likely to be occluded may be masked by the eye-imaging system, and/or the eye-imaging system may be trained to only take images of the eye from perspectives and/or illumination angles that are likely to generate unoccluded images.

As shown in FIG. 2B, iris 204 has an irregular, 3D structure comprising multiple crests and troughs. The iris consists of multiple tissue layers with complex structure and collagen fibers. Although individual 3D features are not repeated between individuals, the boundary between the iris and pupil typically displays an increased texture relative to other portions of the iris. Further, structural elements may vary based on iris color, with darker colored irises typically having coarser textures relative to lighter colored eyes.

Prominent features, such as pupil 202, iris 204, and eyelids 210, may be used to align multiple images of the same eye. By imaging the iris from multiple angles of illumination, it may be possible to generate a panel of aligned images such that 3D features of the iris may be derived, even if the individual images themselves do not include depth information (e.g., 2D images).

While there is a unique 3D structure inherent in a user's iris, the structure created by overlaying ink over the paper by a printer is uncorrelated with the crests and troughs of an iris. For example, the printer may overlay more ink over an area to simulate darker regions, creating a crest of ink, while such darker regions may in fact be derived from troughs on the real iris. Further, a real iris has no high reflective background like a paper printout. When subjected to various illumination changes, such a printed iris will produce a different response from a real iris.

Figure 3:
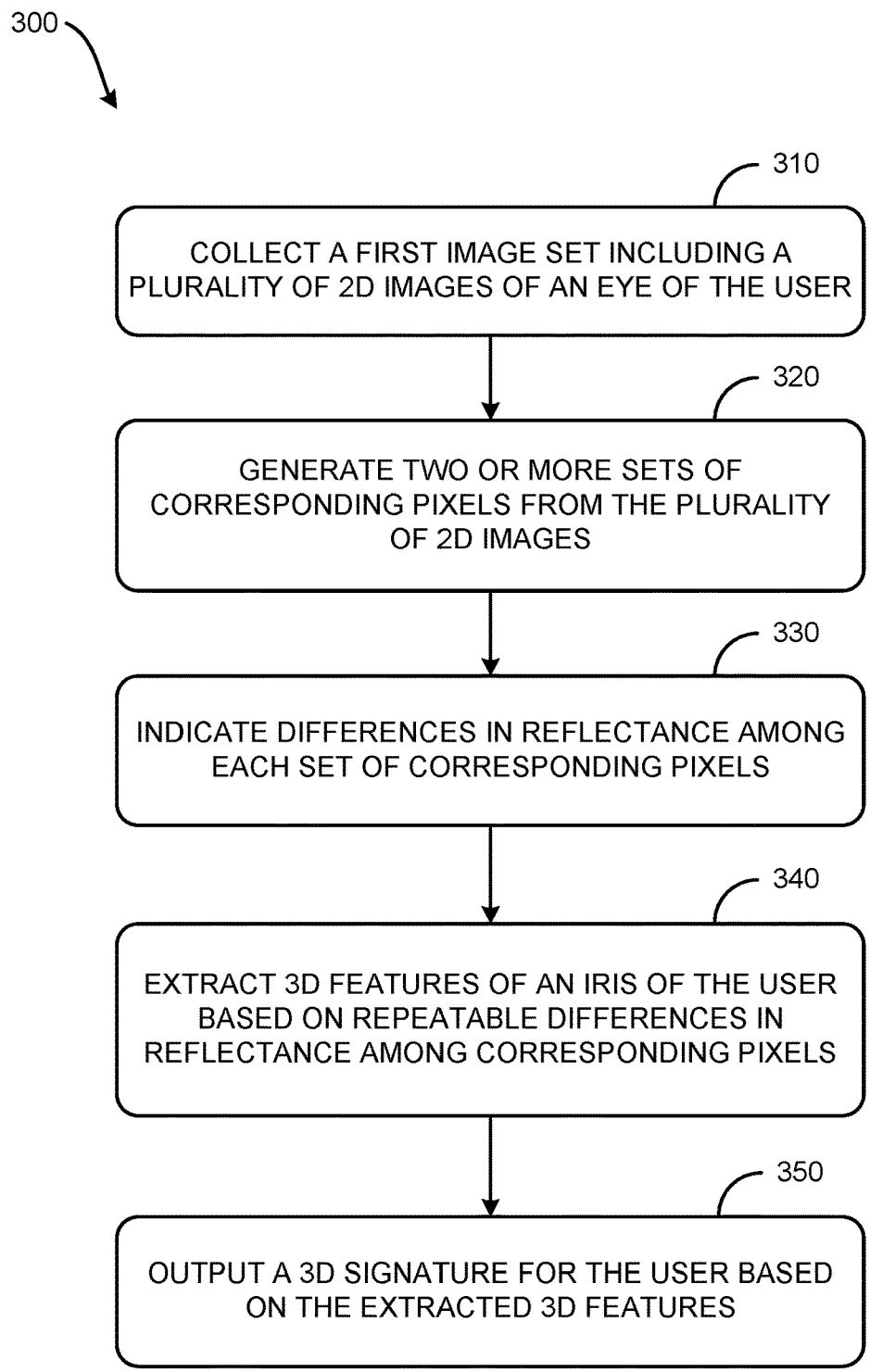
FIG. 3 shows a high-level method for generating a 3D signature for an iris from a plurality of 2D images.

FIG. 3 shows a high-level method 300 for generating a 3D signature for an iris from a plurality of 2D images. Method 300 may be used to generate data for enrolling an individual into an iris-imaging based authentication system, and/or for generating data in the process of verifying a previously enrolled individual.

At 310, method 300 includes collecting a first image set including a plurality of 2D images of an eye of a user. Collecting the first image set may include receiving, from an optical sensor, two or more images, including 2D images of light received from differing reflective angles off the user's iris. By capturing 2D images of the user's eye from different reflective angles, the 3D features of the iris may reflect light from different angles. This may yield 2D images wherein differences in reflectance, shadowing, etc. are visible across multiple images.

As an example, receiving 2D images of a user's eye may include sequentially illuminating the eye of the user using two or more optical sources arranged at different positions relative to the eye of the user, and generating 2D images based on light reflected off the eye of the user and captured via a single optical sensor. For example, one optical source may be turned on at a time. In some examples, two or more optical sources on a same side of the eye may be turned on at the same time (e.g., temporal optical sources 128L). As an example, each eye may be illuminated from the temporal and nasal side sequentially. In the example of eye-imaging system 124, each optical source may be sequentially pulsed on in a circular or other appropriate pattern. In some examples, top side and bottom side illumination may be avoided in order to prevent the generation of shadows by the eyelids.

In other examples, 2D images may be generated based on light reflected off the eye of the user and captured via two or more optical sensors arranged at different positions relative to the eye of the user. One optical source, or multiple optical sources may be utilized to illuminate the eye. Additionally or alternatively, each optical source may be configured to emit light with one or more adjustable characteristics. For example, the optical source may be configured to adjust the wavelength, phase, polarization, intensity, and/or other characteristics of emitted light. The optical source may emit light with a first set of characteristics, then emit light with a second set of characteristics. In some examples, two or more optical sources with differing characteristics may be clustered adjacent to one another. Two or more clusters may be positioned at different points relative to the eye. Similarly, two to more optical sensors with differing characteristics (e.g., sensitive to visible light, sensitive to near-IR light) may be clustered adjacent to one another.

In some examples, the user may be instructed to adjust their gaze for a series of 2D images. The user's eye may be illuminated using one or more optical sources. Instructions may be provided to the user to position the user's eye in two or more sequential conformations. One or more optical sensors may image the user's eye at each gaze position to generate a set of 2D images based on light reflected off the eye of the user at each conformation. For example, a user wearing a head-mounted display device, such as HMD device 110 may be presented a series of images that appear to be located at varying positions on the display. As the user trains their gaze on each sequential image, the eye may be imaged at that conformation.

In some examples, two or more of the described methods may be utilized to generate a plurality of 2D images of an eye of a user, including 2D images with differing reflectance angles. For eye-imaging devices configured to generate 2D images of an eye of a user via two or more of the described methods, one or more imaging methods may be actively selected based on one or more conditions, such as ambient lighting conditions.

The first image set may include two or more subsets of images. Each subset may include two or more 2D images of light received from differing reflective angles off the user's eye. For example, a first subset may include 2D images taken by an optical sensor illuminated by a series of optical sources arranged at differing positions around the user's eye. Each subsequent subset may include 2D images taken by the same optical sensor illuminated by the same optical sources. Each sequential subset may thus be generated at a unique timepoint. The first image set may thus include a plurality of image subsets taken sequentially, each subset including multiple 2D images taken from predetermined reflective angles.

Each image may be acquired with a relatively rapid exposure time (e.g., <4 ms) in order to reduce motion blur. In some examples, the optical sensor(s) may be operated as continuously operating cameras, e.g., at 30 or 60 frames-per-second. One or more camera frames may be discarded between subsets.

At 320, method 300 includes generating two or more sets of corresponding pixels from the plurality of 2D images. For example, the user's iris may be detected within each 2D image based on known iris characteristics, such as shape, color, contrast to the sclera, pupil location, etc. Other eye features, such as the pupil, sclera, eyelids, tear ducts, etc. may also be detected in each 2D image. Each 2D image may then be normalized based on an iris pattern. In some examples, the iris pattern may be normalized to a rectangular array. For each subset of images, the normalized 2D images may then be aligned. For example, template matching techniques may be used to align the normalized images. As an example, template matching may be performed in a single dimension, such as the horizontal direction.

By normalizing the images, the iris may be rendered at the same size and at the same angle within each image. Further, confounding factors, such as pupil dilation, and/or eye angle and distance to the optical sensor, may be eliminated, thereby increasing the likelihood of detecting correspondences during verification. Two or more sets of corresponding pixels may then be generated from the aligned normalized 2D images. For example, a set of corresponding pixels may be generated from the aligned normalized 2D images of each subset. In this context, "corresponding pixels" refers to sets of pixels, including one or more from each aligned normalized 2D image of a subset, that map to the same location on the iris.

Figure 4:
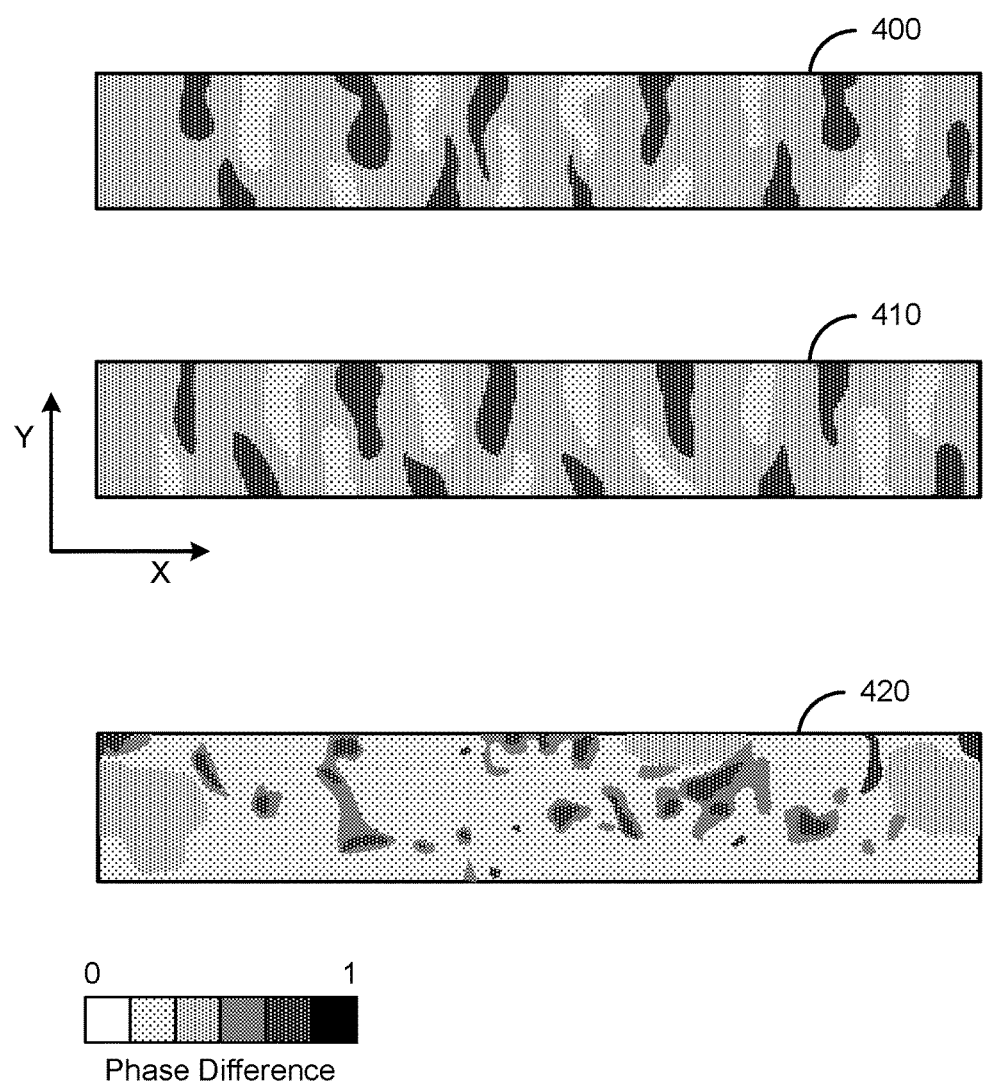
FIG. 4 schematically shows examples of normalized images of an iris illuminated from the right and left side.

As an example, FIG. 4 schematically represents a normalized image 400 of an iris illuminated from the right side, and schematically represents a normalized image 410 of the same iris illuminated from the left side. These images are representationally shown without specific iris imagery. It will be appreciated however, that these images may be of any type, including color or grayscale images, that enable computational processing and visual output so that iris features can be perceived by a viewer of those images. Further, the character of these two images will be appreciated in reference to output 420, explained below. Normalized images 400 and 410 are aligned, such that each pixel (e.g., {x,y} of one image corresponds with a pixel of the other image. Although two normalized images are shown, additional normalized images may be generated in some examples. The right-side image 400 and left-side image 410 typically will differ in appearance to some degree, though there normally will be significant similarities in appearance. In grayscale images, for example, different regions of the two images may appear similar in shape, contour, darkness/lightness, intra-regional changes in characteristics; changes in characteristics from region to region, etc.

In some examples, a user ID may be output based on the plurality of 2D images. For example, one or more of the aligned normalized 2D images may be quantized and stored as data representative of the user's iris. During verification, the user ID may be utilized to determine whether a submitted eye matches initial characteristics of one or more users, prior to undergoing further analysis.

At 330, method 300 includes determining differences in reflectance among each set of corresponding pixels. As one example, reflectance differences may be determined using Gabor filters. The Gabor filter's response may then be mapped to determine an angle (e.g., phase) difference per pixel. Phase differences may be more robust to noise and/or changes in illumination than amplitude differences. The output may be a phase difference map. As an example, FIG. 4 depicts phase difference map 420, generated based on filters applied to aligned normalized images 400 and 410. Each pixel of phase difference map 420 represents a phase difference between corresponding pixels of images 400 and 410.

As an example, if there is a depression or ridge within the iris, illumination from one angle will create a shadow in one direction, while illumination from other angles will create shadows in other directions. By applying a phase shifted, sinusoidal filter, the responses of the corresponding pixels will be shifted relative to one another. Once the filter has been applied, each pixel has real and imaginary components that may be plotted to a 2D vector and further quantized into four regions, yielding a binary bit code. The phase difference map may prevent against spoofing, as a printed image of an iris would generate different values in the generated phase difference map.

At 340, method 300 includes extracting one or more 3D features of an iris of the user based on repeatable differences in reflectance among each set of corresponding pixels. While many of the pixels that demonstrate a threshold phase difference are representative of 3D features of the iris, the phase difference maps may retain some noise and false positives. False positives may arise due to the nature of the optical sources, due to a user wearing glasses (e.g., additional glare, reflectance), due to glints off the user's cornea, etc. Further, the iris may include fragile areas, 3D features which change over time due to the nature of iris texture. These fragile areas can cause reflectance differences over time, even from the same illumination source. Conversely, regions of a phase difference map that do not show a phase difference do not necessarily indicate a lack of 3D structure, just an inability to find it. For example, the iris may not be illuminated effectively to create shadows in that area.

In order to delineate these differences and narrow subsequent analysis and matching to repeatable features, the phase difference maps may be averaged to determine which pixels are consistently matching (or not matching). 3D features may thus be extracted based on differences in reflectance across all subsets of 2D images. In this way, differences in reflectance which are caused due to the 3D features of the iris may be extracted.

To extract 3D features based on differences in reflectance, phase difference maps derived from two or more subsets of images may be compared, and repeatable differences extracted. As the subsets are separated temporally, real 3D structure should be persistent over time, and thus the corresponding pixels should demonstrate similar phase differences over time. As such, pixels may be striated into categories, such as: pixels with corresponding phase that do not have 3D structure; pixels with phase differences due to noise or random changes; and pixels with phase differences that are relevant to/related to 3D structure.

For example, phase differences that change by significant, repeatable amounts are likely derived from real 3D structure. If the phase differences change by random amounts, they are more likely to be derived from fragile bits or noise. Prior to quantization, the magnitude of the 2D vector indicates the likelihood that the response will change. If the magnitude of the vector is small, that pixel is more likely to fluctuate to another quadrant. Similarly, if the vector is closer to one axis, the pixel is more likely to fluctuate.

At 350, method 300 may include outputting a 3D signature for the user based on the extracted 3D features. The areas of the phase difference map that were classified as having repeatable differences in reflectance caused by 3D structures may be extracted as features in building a 3D signature for a given user. A temporal phase difference map may be generated, indicating regions where 3D features exist, and/or where 3D features do not exist. Blob IDs may be assigned to the indicated regions of the temporal phase difference map where repeatable 3D features exist.

Figure 5:
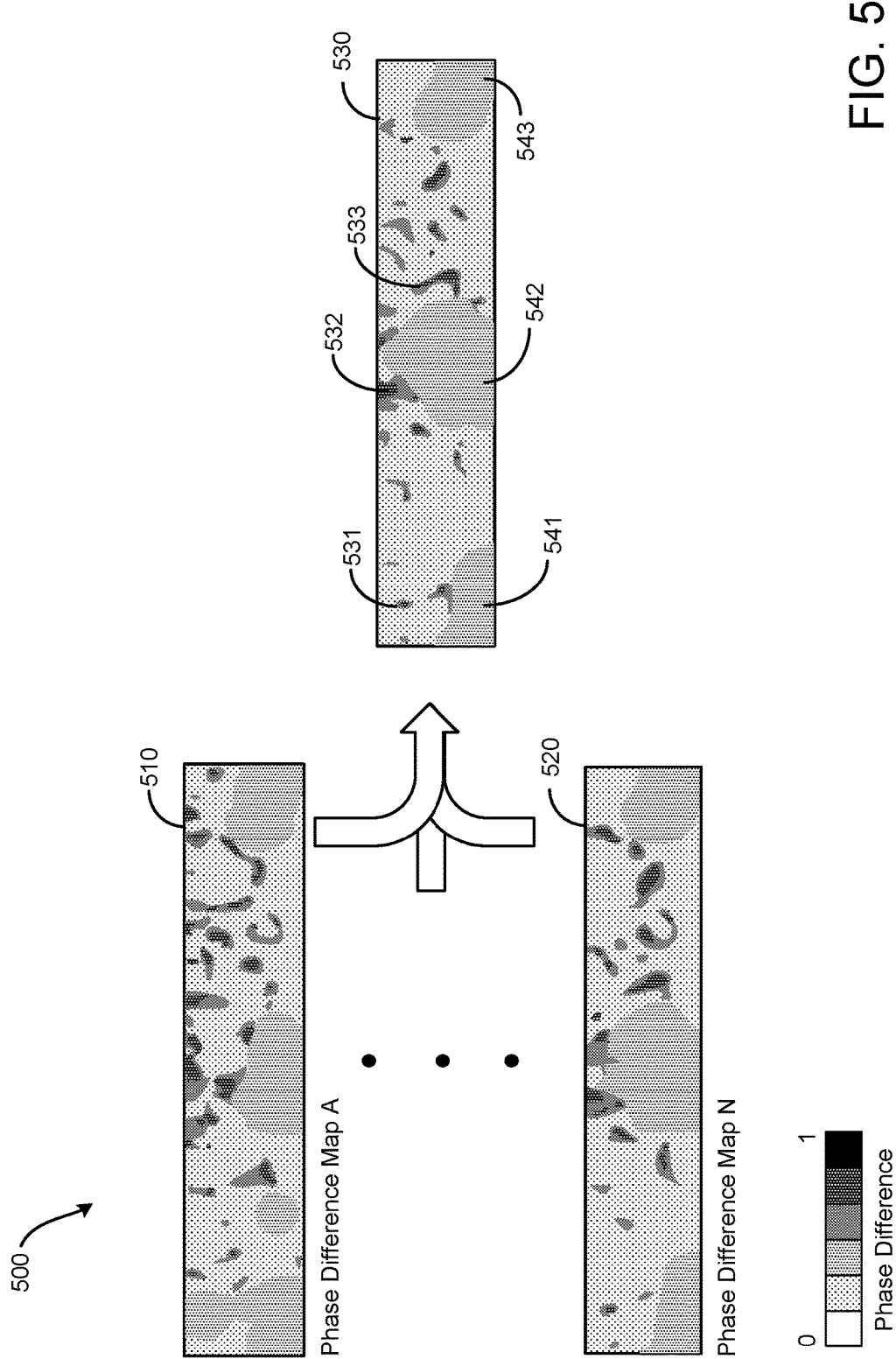
FIG. 5 schematically shows examples of 3D features for an iris derived from differences in reflectance at the iris.

An example temporal phase map is shown in FIG. 5. At 500, a plurality of phase difference maps for an iris are indicated. While only two phase difference maps are depicted (phase difference map 510 and phase difference map 520), one or more additional phase difference maps may be generated and analyzed along with the depicted maps. Together, repeatable differences across phase difference maps 500 may be used to generate a temporal phase difference map 530.

Areas of significant phase difference within temporal phase difference map 530 may be identified and cataloged as 3D features for subsequent analysis and comparison during verification. For example, regions 531, 532, and 533 may be assigned blob IDs, which may include data pertaining to location, size, shape, phase difference, etc. Masked areas, such as regions 541, 542, and 543 may be derived from glints or other saturating reflections. These regions may be cataloged, but may not be used as 3D features for the purposes of user verification.

Figure 6:
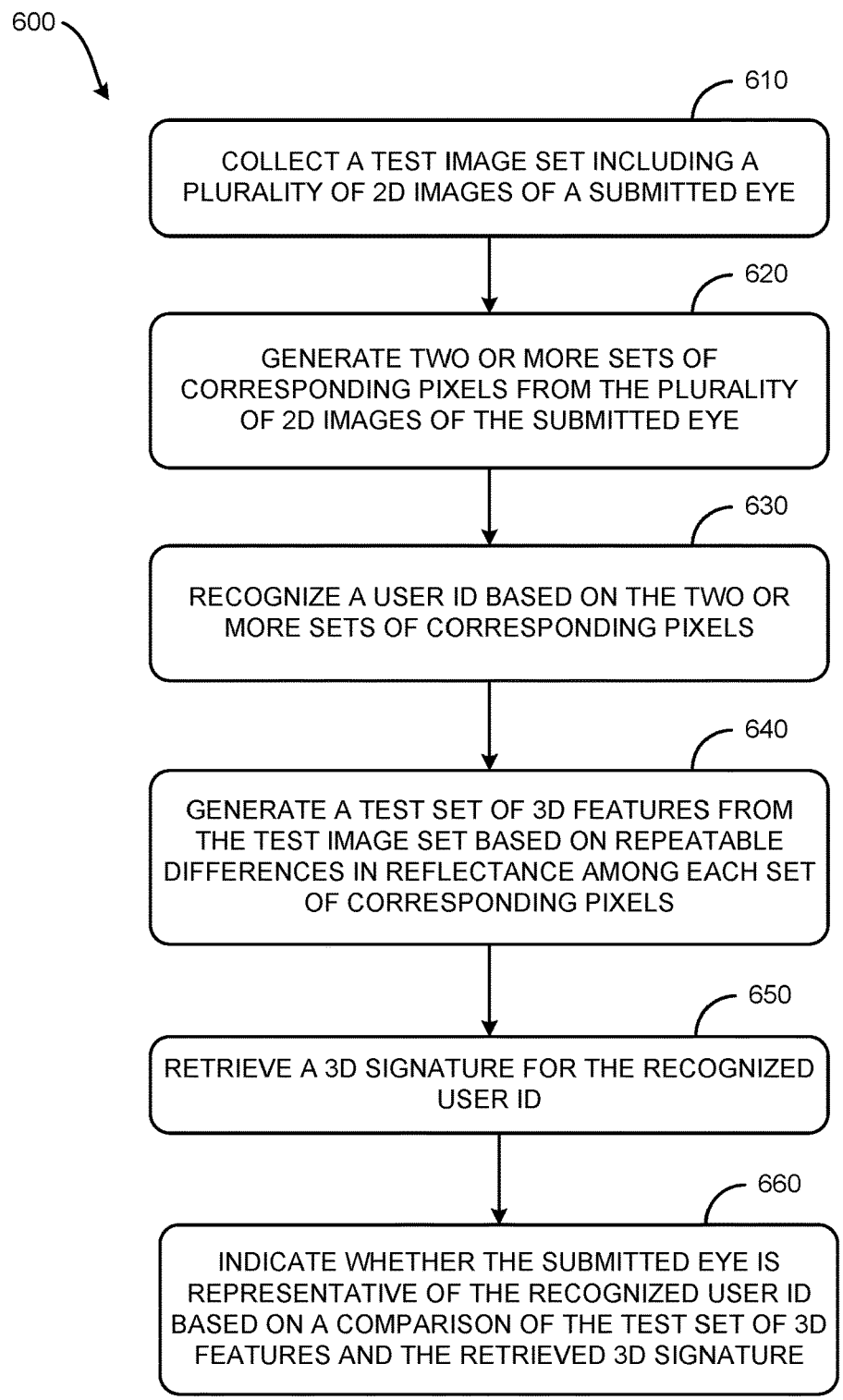
FIG. 6 shows a high-level method for verifying a user based on a 3D signature for an iris.

To authenticate and/or verify a registered user, the user may submit one or both eyes for imaging and feature extraction using methods similar to those described with regard to method 300. FIG. 6 shows a high-level method 600 for verifying a user based on a 3D signature for an iris. At 610, method 600 includes collecting a test image set including a plurality of 2D images of a submitted eye. For example, collecting the first test image set may include receiving, from one or more optical sensors, one or more subsets of images including 2D images of light received from differing reflective angles off the submitted eye.

In some examples, the test image set may be generated using a different imaging device and/or imaging method than the image set used to generate the original (i.e., enrolled) 3D signature. The test image set may be generated using a method based on available imaging hardware. For example, an enrollment image set and enrolled 3D signature may be generated using a head-mounted display device, such as HMD device 110, having multiple optical sources and a single optical sensor for each eye. If the 3D signature is used to protect multiple devices, the test image set may be generated at a different device having a single optical source and optical sensor, such as a smartphone. The test image set may thus be generated by asking the user to adjust a gaze so that images from differing reflectance angles may be generated. In another example, the enrollment image set may be generated at an HMD device where the user is asked to adjust a gaze and the user's eye is imaged using light from multiple optical sources for each gaze conformation. A test image set may subsequently be generated without asking the user to adjust a gaze. A user that previously had only one eye imaged at enrollment may be indicated to image the same eye in generating the test set.

At 620, method 600 includes generating two or more sets of corresponding pixels from the plurality of 2D images of the submitted eye. As described with regard to FIG. 3, the user's iris, along with other eye features may be detected within each 2D image. Each 2D image may then be normalized based on an iris pattern. For each subset of images, the normalized 2D images may then be aligned.

At 630, method 600 includes recognizing a user ID based on the two or more sets of corresponding pixels. For example, characteristics of one or more aligned, normalized images may be quantized and compared with images corresponding to user IDs for all enrolled users. Eye characteristics, such as iris color, eye shape, etc. may be utilized to restrict the number of comparisons. If no user ID is recognized based on the two or more sets of corresponding pixels, the authentication process may be aborted, and/or the user may be asked to have their eye re-imaged. If a user ID is recognized, the authentication process may proceed.

At 640, method 600 includes generating a comparison set of 3D features from the test image set based on differences in reflectance among each set of corresponding pixels. As described with regard to FIG. 3, this may include determining differences in reflectance among corresponding pixels for a subset of images, generating a phase difference map for each subset of images, and extracting 3D features that are repeatable across two or more phase difference maps. A test set of the extracted 3D features may include a temporal phase difference map.

At 650, method 600 includes retrieving a 3D signature for the recognized user ID. The 3D signature may be stored within a database of 3D signatures for all enrolled users of the device being authenticated. For a verification system, by retrieving a single 3D signature, both data transfer and processing are reduced. This may significantly reduce the duration of the verification process, as compared to identification systems in which the devices would compare an iris image to all enrolled images, and/or for devices that do not store verification information locally.

At 660, method 600 includes indicating whether the submitted eye is representative of the recognized user ID based on a comparison of the comparison set of 3D features and the retrieved 3D signature. For example, the comparison set of 3D features may be evaluated for the presence of one or more blob IDs from the retrieved 3D signature. In some examples, the comparison set of 3D features and the retrieved 3D signature may be evaluated using image matching algorithms, such as scale-invariant feature transform (SIFT), or by using a hamming distance on the quantized representation of 3D features. Indicating that the submitted eye is representative of the user ID may be based on a threshold amount of similarity and/or identity between the comparison set of 3D features and the retrieved 3D signature.

Figure 7:
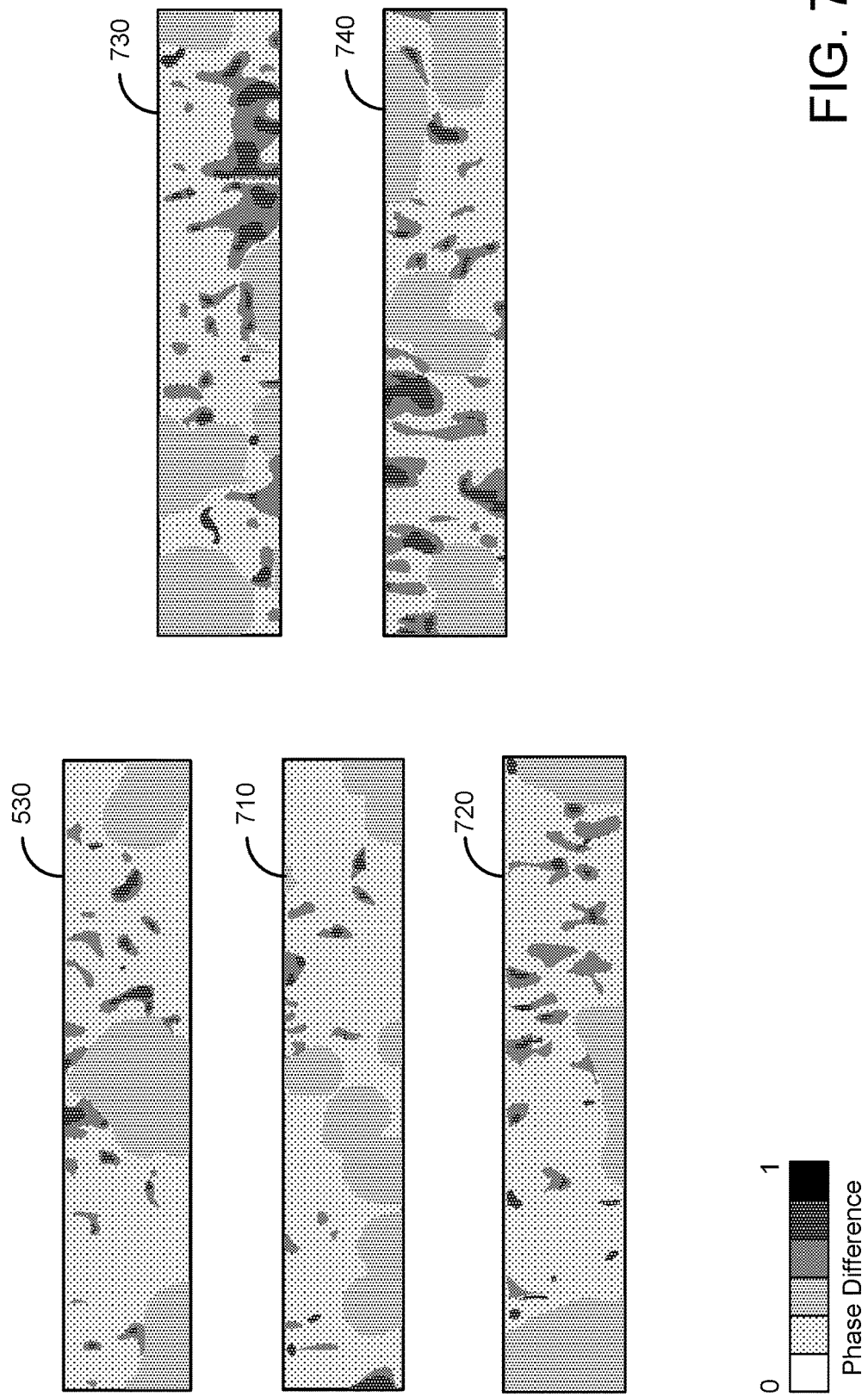
FIG. 7 schematically shows examples of phase difference maps for real and spoofed irises.

As an example, FIG. 7 shows temporal phase difference map 530, derived from a first user. FIG. 7 also shows temporal phase difference map 710, representing a photo of an iris of the first user printed on glossy paper, and temporal phase difference map 720, representing a photo of an iris of the first user printed on standard, non-glossy paper. FIG. 7 also shows temporal phase difference map 730, derived from a second user, and temporal phase difference map 740, derived from a third user. Neither temporal phase difference maps 710, 720, 730, or 740 demonstrate sufficient similarity or identity to temporal phase difference map 530 for authentication.

If the comparison set of 3D features is sufficiently similar/identical to the retrieved 3D signature, the user may be indicated as authentic, and the user may be granted access to the protected device or area. In some examples, the user may be requested to provide a secondary means of authentication, such as a password, or touching a particular location of a screen, prior to being granted full access. If the comparison set of 3D features is not sufficiently similar/identical to the retrieved 3D signature, the user may not be authenticated, and access may not be granted. In some examples, the user may be allowed one or more additional opportunities to resubmit an eye for imaging. In some examples, a user may be locked from further authentication attempts following one or more failed authentication attempts.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
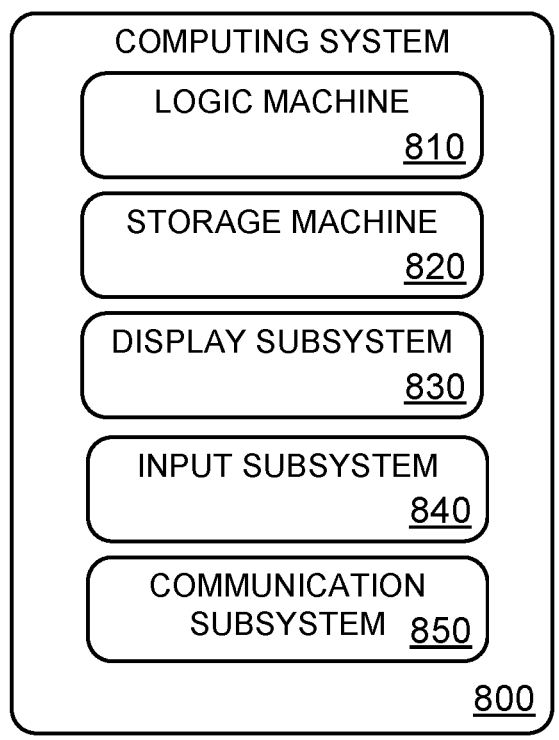
FIG. 8 shows a block diagram of an example computing device.

FIG. 8 schematically shows a non-limiting embodiment of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), and/or other computing devices.

Computing system 800 includes a logic machine 810 and a storage machine 820. Computing system 800 may optionally include a display subsystem 830, input subsystem 840, communication subsystem 850, and/or other components not shown in FIG. 8.

Logic machine 810 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 820 includes one or more physical devices configured to hold instructions executable by the logic machine to implement the methods and processes described herein. When such methods and processes are implemented, the state of storage machine 820 may be transformed—e.g., to hold different data.

Storage machine 820 may include removable and/or built-in devices. Storage machine 820 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 820 may include volatile, nonvolatile, dynamic, static, read/write, read-only, random-access, sequential-access, location-addressable, file-addressable, and/or content-addressable devices.

It will be appreciated that storage machine 820 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 810 and storage machine 820 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 800 implemented to perform a particular function. In some cases, a module, program, or engine may be instantiated via logic machine 810 executing instructions held by storage machine 820. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 830 may be used to present a visual representation of data held by storage machine 820. This visual representation may take the form of a graphical user interface (GUI). As the herein described methods and processes change the data held by the storage machine, and thus transform the state of the storage machine, the state of display subsystem 830 may likewise be transformed to visually represent changes in the underlying data. Display subsystem 830 may include one or more display devices utilizing virtually any type of technology. Such display devices may be combined with logic machine 810 and/or storage machine 820 in a shared enclosure, or such display devices may be peripheral display devices.

When included, input subsystem 840 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 850 may be configured to communicatively couple computing system 800 with one or more other computing devices. Communication subsystem 850 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

In one example, a method for authenticating a user comprises collecting a first image set including a plurality of 2D images of an eye of the user; generating two or more sets of corresponding pixels from the plurality of 2D images; extracting one or more 3D features of an iris of the user based on repeatable differences in reflectance among each set of corresponding pixels; generating a test set of 3D features for a submitted eye based on a second image set, the second image set including a plurality of 2D images of the submitted eye; and indicating whether the second image set is representative of the user's eye based on a comparison of the one or more extracted 3D features and the test set of 3D features. In such an example, or any other example, collecting the first image set may additionally or alternatively include receiving, from an optical sensor, at least a first subset of images including 2D images of light received from differing reflective angles off the user's eye. In any of the preceding examples, or any other example, receiving the first subset of images may additionally or alternatively include sequentially illuminating the eye of the user using two or more optical sources arranged at different positions relative to the eye of the user; and generating 2D images based on light reflected off the eye of the user and captured via a single optical sensor. In any of the preceding examples, or any other example, receiving the first subset of images may additionally or alternatively include illuminating the eye of the user using one or more optical sources; and generating 2D images based on light reflected off the eye of the user and captured via two or more optical sensors arranged at different positions relative to the eye of the user. In any of the preceding examples, or any other example, receiving the first subset of images may additionally or alternatively include illuminating the eye of the user using one or more optical sources; instructing the user to sequentially position the user's eye in two or more conformations; and generating 2D images based on light reflected off the eye of the user and captured via one or more optical sensors. In any of the preceding examples, or any other example, the first image set may additionally or alternatively include two or more sequential subsets of images; each sequential subset may additionally or alternatively include 2D images of light received from differing reflective angles off the user's eye; and each sequential subset may additionally or alternatively be generated at a unique timepoint. In any of the preceding examples, or any other example, generating two or more sets of corresponding pixels from the plurality of 2D images may additionally or alternatively include: detecting an iris within each 2D image; normalizing each 2D image based on an iris pattern; aligning the normalized 2D images of each subset; and generating corresponding pixels from the aligned normalized 2D images of each subset. In any of the preceding examples, or any other example, extracting one or more 3D features of an iris of the user based on differences in reflectance among each set of corresponding pixels may additionally or alternatively include indicating differences in reflectance across corresponding pixels for each subset; extracting 3D features based on repeatable differences in reflectance across all subsets; and outputting a 3D signature for the user based on the extracted 3D features. In any of the preceding examples, or any other example, extracting 3D features based on repeatable differences in reflectance across all subsets may additionally or alternatively include comparing phase differences at corresponding pixels across all subsets; and classifying pixels that demonstrate phase differences due to 3D structure separately from pixels that demonstrate phase differences that are not due to 3D structure and from pixels that do not demonstrate phase differences above a threshold. In any of the preceding examples, or any other example, the first and second image sets may additionally or alternatively be generated via different imaging devices.

In another example, a method for authenticating a user, comprises: collecting a test image set including a plurality of 2D images of a submitted eye; generating two or more sets of corresponding pixels from the plurality of 2D images of the submitted eye; recognizing a user ID based on the two or more sets of corresponding pixels; generating a test set of 3D features from the test image set based on repeatable differences in reflectance among each set of corresponding pixels; retrieving an enrolled 3D signature for the recognized user ID; and indicating whether the test set of 3D features are representative of the recognized user ID based on a comparison of the test set of 3D features and the enrolled 3D signature. In such an example, or any other example, collecting the test image set may additionally or alternatively include receiving, from an optical sensor, at least a first subset of images including 2D images of light received from differing reflective angles off the submitted eye. In any of the preceding examples, or any other example, receiving the first subset of images may additionally or alternatively include sequentially illuminating the submitted eye using two or more optical sources arranged at different positions relative to the submitted eye; and generating 2D images based on light reflected off the submitted eye and captured via a single optical sensor. In any of the preceding examples, or any other example, the test image set may additionally or alternatively include one or more sequential subsets of images; each sequential subset may additionally or alternatively include 2D images of light received from differing reflective angles off the submitted eye; and each sequential subset may additionally or alternatively be generated at a unique timepoint. In any of the preceding examples, or any other example, generating two or more sets of corresponding pixels from the plurality of 2D images may additionally or alternatively include detecting an iris within each 2D image; normalizing each 2D image based on an iris pattern; aligning the normalized 2D images of each subset; and generating corresponding pixels from the aligned normalized 2D images of each subset. In any of the preceding examples, or any other example, generating a comparison set of 3D features from the comparative image set based on differences in reflectance among each set of corresponding pixels may additionally or alternatively include: indicating differences in reflectance across corresponding pixels for each subset; extracting 3D features based on repeatable differences in reflectance across all subsets; and outputting a comparison set of 3D features based on the extracted 3D features. In any of the preceding examples, or any other example, extracting 3D features based on repeatable differences in reflectance across all subsets may additionally or alternatively include: comparing phase differences at corresponding pixels across all subsets; classifying pixels that demonstrate phase differences due to 3D structure separately from pixels that demonstrate phase differences that are not due to 3D structure and from pixels that do not demonstrate phase differences above a threshold.

In yet another example, a system for authenticating a user, comprises one or more optical sources configured to illuminate the eye of a user; one or more optical sensors configured to receive reflected illumination off the eye of the user; and a controller configured to: collect a first image set including a plurality of 2D images of an eye of the user received from differing reflective angles off the user's eye; generate two or more sets of corresponding pixels from the plurality of 2D images; and extract one or more 3D features of an iris of the user based on repeatable differences in reflectance among each set of corresponding pixels. In such an example, or any other example, the one or more optical sensors may additionally or alternatively include two or more optical sensors arranged at different positions relative to the user's eye, and the controller may additionally or alternatively be configured to sequentially illuminate the eye of the user using the two or more optical sources. In any of the preceding examples, or any other example, the first image set may additionally or alternatively include two or more sequential subsets of images, wherein each sequential subset including 2D images of light received from differing reflective angles off the user's eye, and wherein each sequential subset is generated at a unique timepoint.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for authenticating a user, comprising:
   collecting a first image set including a plurality of 2D images of an eye of the user, the first image set including two or more sequential subsets of images, each sequential subset generated at a unique timepoint;
   generating two or more sets of corresponding pixels from the plurality of 2D images;
   extracting one or more 3D features of an iris of the user based on repeatable differences in reflectance over time among each set of corresponding pixels;
   generating a test set of 3D features for a submitted eye based on a second image set, the second image set including a plurality of 2D images of the submitted eye; and
   indicating whether the second image set is representative of the user's eye based on a comparison of the one or more extracted 3D features and the test set of 3D features.

2. The method of claim 1, wherein collecting the first image set includes receiving, from an optical sensor, at least a first subset of images including 2D images of light received from differing reflective angles off the user's eye.

3. The method of claim 2, wherein receiving the first subset of images includes:
   sequentially illuminating the eye of the user using two or more optical sources arranged at different positions relative to the eye of the user; and
   generating 2D images based on light reflected off the eye of the user and captured via a single optical sensor.

4. The method of claim 2, wherein receiving the first subset of images includes:
   illuminating the eye of the user using one or more optical sources; and
   generating 2D images based on light reflected off the eye of the user and captured via two or more optical sensors arranged at different positions relative to the eye of the user.

5. The method of claim 2, wherein receiving the first subset of images includes:
   illuminating the eye of the user using one or more optical sources;
   instructing the user to sequentially position the user's eye in two or more conformations; and
   generating 2D images based on light reflected off the eye of the user and captured via one or more optical sensors.

6. The method of claim 2, wherein:
   each sequential subset includes 2D images of light received from differing reflective angles off the user's eye.

7. The method of claim 6, wherein generating two or more sets of corresponding pixels from the plurality of 2D images includes:
   detecting an iris within each 2D image;
   normalizing each 2D image based on an iris pattern;
   aligning the normalized 2D images of each subset; and
   generating corresponding pixels from the aligned normalized 2D images of each subset.

8. The method of claim 6, wherein extracting one or more 3D features of an iris of the user based on differences in reflectance among each set of corresponding pixels includes:
   indicating differences in reflectance across corresponding pixels for each subset;
   extracting 3D features based on repeatable differences in reflectance across all subsets; and
   outputting a 3D signature for the user based on the extracted 3D features.

9. The method of claim 8, wherein extracting 3D features based on repeatable differences in reflectance across all subsets includes:
   comparing phase differences at corresponding pixels across all subsets; and
   classifying pixels that demonstrate phase differences due to 3D structure separately from pixels that demonstrate phase differences that are not due to 3D structure and from pixels that do not demonstrate phase differences above a threshold.

10. The method of claim 1, wherein the first and second image sets are generated via different imaging devices.

11. A method for authenticating a user, comprising:
    collecting a test image set including a plurality of 2D images of a submitted eye the test image set including two or more sequential subsets of images, each sequential subset generated at a unique timepoint;
    generating two or more sets of corresponding pixels from the plurality of 2D images of the submitted eye;
    recognizing a user ID based on the two or more sets of corresponding pixels;
    generating a test set of 3D features from the test image set based on repeatable differences in reflectance over time among each set of corresponding pixels;
    retrieving an enrolled 3D signature for the recognized user ID; and
    indicating whether the test set of 3D features are representative of the recognized user ID based on a comparison of the test set of 3D features and the enrolled 3D signature.

12. The method of claim 11, wherein collecting the test image set includes receiving, from an optical sensor, at least a first subset of images including 2D images of light received from differing reflective angles off the submitted eye.

13. The method of claim 12, wherein receiving the first subset of images includes:
    sequentially illuminating the submitted eye using two or more optical sources arranged at different positions relative to the submitted eye; and
    generating 2D images based on light reflected off the submitted eye and captured via a single optical sensor.

14. The method of claim 12, wherein:
    each sequential subset includes 2D images of light received from differing reflective angles off the submitted eye.

15. The method of claim 14, wherein generating two or more sets of corresponding pixels from the plurality of 2D images includes:
- detecting an iris within each 2D image;
- normalizing each 2D image based on an iris pattern;
- aligning the normalized 2D images of each subset; and
- generating corresponding pixels from the aligned normalized 2D images of each subset.

16. The method of claim 14, wherein generating a comparison set of 3D features from the comparative image set based on differences in reflectance among each set of corresponding pixels includes:
- indicating differences in reflectance across corresponding pixels for each subset;
- extracting 3D features based on repeatable differences in reflectance across all subsets; and
- outputting a comparison set of 3D features based on the extracted 3D features.

17. The method of claim 16, wherein extracting 3D features based on repeatable differences in reflectance across all subsets includes:
- comparing phase differences at corresponding pixels across all subsets;
- classifying pixels that demonstrate phase differences due to 3D structure separately from pixels that demonstrate phase differences that are not due to 3D structure and from pixels that do not demonstrate phase differences above a threshold.

18. A system for authenticating a user, comprising:
- one or more optical sources configured to illuminate the eye of a user;
- one or more optical sensors configured to receive reflected illumination off the eye of the user; and
- a controller configured to:
  - collect a first image set including a plurality of 2D images of an eye of the user received from differing reflective angles off the user's eye, the first image set including two or more sequential subsets of images, each sequential subset generated at a unique timepoint;
  - generate two or more sets of corresponding pixels from the plurality of 2D images; and
  - extract one or more 3D features of an iris of the user based on repeatable differences in reflectance over time among each set of corresponding pixels.

19. The system of claim 18, wherein the one or more optical sensors include two or more optical sensors arranged at different positions relative to the user's eye, and wherein the controller is configured to sequentially illuminate the eye of the user using the two or more optical sources.

20. The system of claim 19, wherein each sequential subset including 2D images of light received from differing reflective angles off the user's eye.

* * * * *